(12) United States Patent
Osseiran et al.

(10) Patent No.: US 12,003,343 B2
(45) Date of Patent: Jun. 4, 2024

(54) LIGHTWEIGHT CHAT SESSION PARTICIPANT

(71) Applicant: Apple Inc., Cupertino, CA (US)

(72) Inventors: Jad Osseiran, San Francisco, CA (US); Xudong Liu, Campbell, CA (US); Andrew J. Daley, Santa Clara, CA (US); Adam Y. Syed, Cupertino, CA (US); Nicholas J. Circosta, Mountain View, CA (US); Sunil S. Rao, San Jose, CA (US); Zak C. Wegweiser, San Francisco, CA (US); Jingyao Zhang, Sunnyvale, CA (US); Wan-Ya Chen, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/744,592

(22) Filed: May 13, 2022

(65) Prior Publication Data

US 2022/0368551 A1    Nov. 17, 2022

Related U.S. Application Data

(60) Provisional application No. 63/189,151, filed on May 15, 2021.

(51) Int. Cl.
*H04L 12/18* (2006.01)
*H04L 9/40* (2022.01)

(52) U.S. Cl.
CPC ...... *H04L 12/1822* (2013.01); *H04L 12/1827* (2013.01); *H04L 63/0876* (2013.01)

(58) Field of Classification Search
CPC .................... H04L 12/1822; H04L 63/0876
USPC ................................................. 709/204
See application file for complete search history.

(56) References Cited

U.S. PATENT DOCUMENTS

| 2007/0174399 A1* | 7/2007 | Ogle ............... H04L 51/04 |
| | | 709/206 |
| 2016/0127282 A1* | 5/2016 | Nezarati ......... H04L 12/1822 |
| | | 709/206 |
| 2018/0198831 A1* | 7/2018 | Calcaterra ......... H04L 63/102 |

* cited by examiner

*Primary Examiner* — Sibte H Bukhari
(74) *Attorney, Agent, or Firm* — BAKERHOSTETLER

(57) ABSTRACT

A method is provided that includes receiving, at a media device and from a client device, a request for a temporary identifier for a group chat session, and provisioning, by the media device, the temporary identifier based on a device identifier of the media device. The media device provides the temporary identifier to the client device. The media device receives from a server an invitation to join the group chat session, where the invitation is directed to the temporary identifier, and the media device joins the group chat session.

20 Claims, 4 Drawing Sheets

LIGHTWEIGHT CHAT SESSION PARTICIPANT

CROSS-REFERENCE TO RELATED APPLICATIONS

The application claims the benefit of priority to U.S. Provisional Application No. 63/189,151, entitled "Lightweight Chat Session Participant", filed on May 15, 2021, the disclosure of which is hereby incorporated herein in its entirety.

TECHNICAL FIELD

The subject application relates generally to electronic communications, including managing group chat sessions.

BACKGROUND

Chat applications enable near real-time communications between users via networks such as the Internet. Current chat applications simulate a face-to-face experience using audio and video streams from the participants in a chat session. Chat application also may facilitate the sharing of content items such as audio and/or video files among participants in a chat session.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
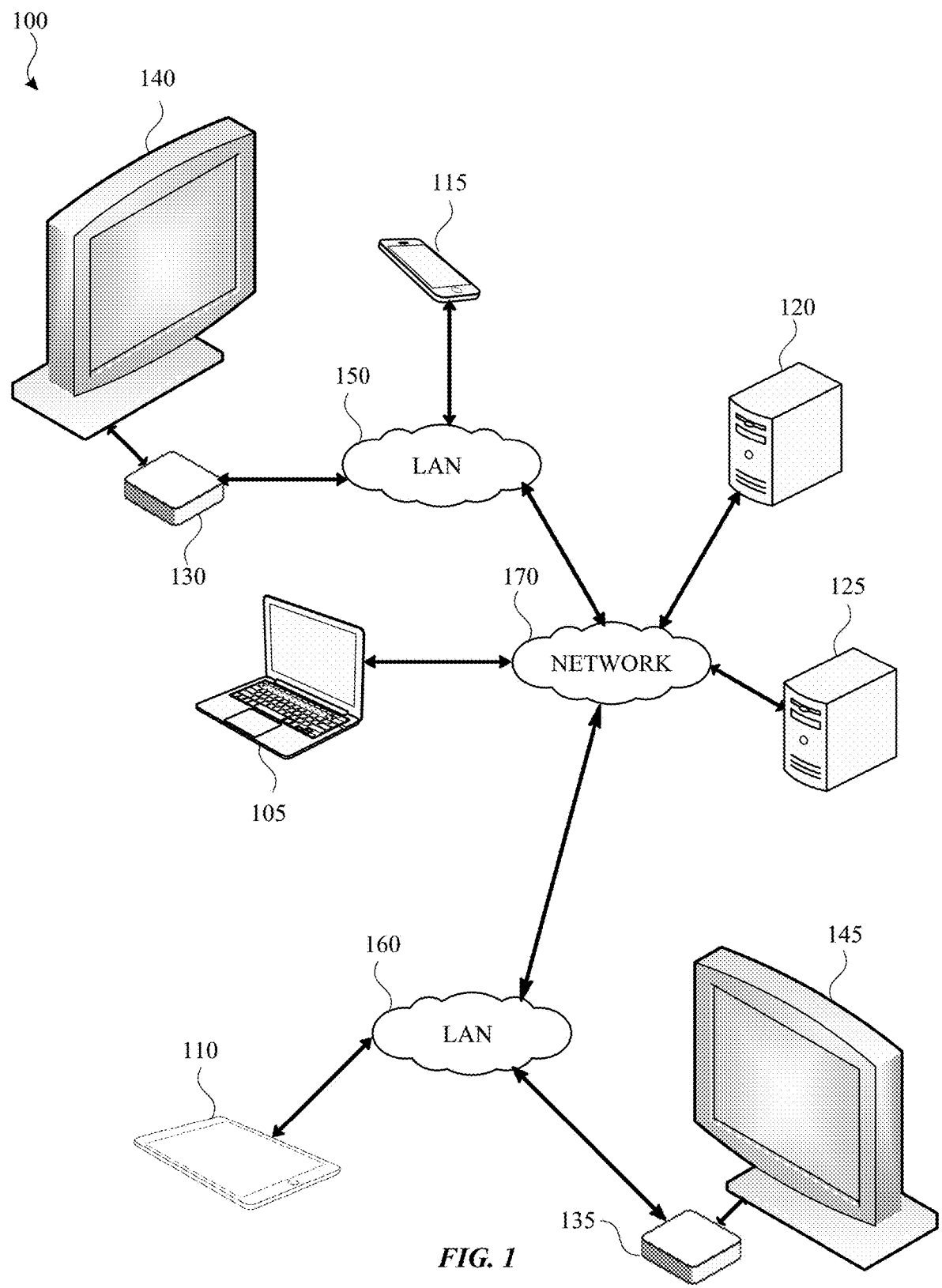
FIG. 1 illustrates an example network environment in which the subject technology may operate in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring concepts of the subject technology.

Chat applications facilitate communications across a network between participants in a chat session. Chat applications may provide communications as simple as text messages exchanged between participants. Chat applications also may provide near real-time video communications using audio and video streams generated for each participant in a chat session. In addition to communications between participants in a chat session, chat applications may facilitate the sharing of content, such as video content, from one participant to other participants in the chat session. Instead of simply sharing content, chat applications may enable participants to consume the shared content simultaneously using control signals shared among the participants.

Media devices are electronic devices configured to access and playback media content. The media content may be in the form of audio files, image files, and/or video files. The media content may be accessed via a network on one or more content servers by a media device. Once accessed, the media content may be downloaded to the media device for possible offline playback or may be streamed from the content server for current playback purposes. Media devices may be specifically designed for media content playback and may not have hardware used by chat applications, such as microphones and/or cameras.

The subject technology takes advantage of media devices in the context of chat sessions to allow for group consumption of media content. For example, participants in a group chat session may add respective media devices to the chat session to consume video content simultaneously as a group. The playback of the video content may be synchronized across the group of participants using command and control signals distributed to the respective media devices.

Different users may assume control of a media device at different times using their respective client devices. If a single identifier were used for the media device and therefore is known by each user that has assumed control of the media device, a security risk exists that might allow an unwanted user to access a group chat session via the media device participating in the group chat session. To alleviate this risk, the subject technology introduces the use of pseudonyms or temporary identifiers for a media device joining a group chat session. A unique temporary identifier is provisioned for each group chat session and deleted after the group chat session ends. These and other advantages provided by the subject technology will be apparent based on the description provided below.

FIG. 1 illustrates an example network environment 100 in which the subject technology may operate in accordance with one or more implementations. Not all of the depicted components may be used in all implementations, however, and one or more implementations may include additional or different components than those shown in the figure. Variations in the arrangement and type of the components may be made without departing from the scope of the claims as set forth herein. Additional components, different components, or fewer components may be provided.

As illustrated in FIG. 1, network environment 100 includes electronic devices 105, 110, and 115 (hereinafter "electronic devices 105-115"), servers 120 and 125 (hereinafter "servers 120-125), media devices 130 and 135 (hereinafter "media devices 130-135"), display devices 140 and 145 (hereinafter "display devices 140-145"), local area networks (LAN) 150 and 160, and network 170. In one or more implementations, LAN 150 may communicatively couple (directly or indirectly) electronic device 115 and media device 130 in a local network environment; LAN 160 may communicatively couple (directly or indirectly) electronic device 110 and media device 135 in another local network environment. Additionally, LAN 150 may communicatively couple (directly or indirectly) electronic device 115 and media device 130 to any of electronic devices 105 and 110, media device 135, and servers 120-125 via network 170.

In one or more implementations, LANs 150 and 160 may include one or more different network devices/network medium and/or may utilize one or more different wireless and/or wired network technologies, such as Ethernet, optical, Wi-Fi, Bluetooth, Zigbee, Powerline over Ethernet, coaxial, Ethernet, Z-Wave, cellular, or generally any wireless and/or wired network technology that may communicatively couple two or more devices. LANs 150 and 160 may use the same network technology or different network technologies. In one or more implementations, network 170 may be an interconnected network of devices that may include, and/or may be communicatively coupled to, the Internet.

FIG. 1 illustrates electronic device 105 as a laptop computer, electronic device 110 as a tablet device, and electronic device 115 as smartphone. The subject technology is not limited to these types or numbers of electronic devices. For example, any of electronic devices 105-115 may be a computing device such as a laptop computer, a smartphone, a set top box including a digital media player, a tablet device, a wearable device such as a smartwatch or a band, or any other appropriate device that is capable of executing client applications, providing access to the client applications via a graphical user interface, and includes and/or is communicatively coupled to, for example, one or more wired or wireless interfaces, such as WLAN radios, cellular radios, Bluetooth radios, Zigbee radios, near field communication (NFC) radios, and/or other wireless radios. For purposes of this description, electronic devices 105-115 also may be referred to as client devices.

Servers 120-125 each represent one or more computing devices that are configured to provide services to users via client applications being executed on electronic devices 105-115. For example, server 120 may provide a group chat service through which users may log into and participate in chat sessions in groups of two or more users. The chat sessions may use audio and video streams generated from each participant's client device to provide a video chat session. Server 125 may be configured to provide video services by storing and indexing video files that are accessible in a video client application being executed on electronic devices 105-115 and/or media devices 130-135. The subject technology is not limited to this number of services or these types of services. For example, one or more of servers 120-125 may provide access to other types of content including, but not limited to, audio files, websites, computer games, documents, multi-media files, etc.

Media devices 130-135 represent electronic devices configured to access and playback media content from server 125, for example. The media content may be in the form of audio files, image files, and/or video files. Media device 130 is depicted as being communicatively coupled to display device 140 and media device 135 is depicted as being communicatively coupled to display device 145. Display devices 140 and 145 represent any type of display device, such as a liquid crystal display (LCD), a light emitting diode (LED) display, an organic light emitting diode (OLED) display, a flexible display, a flat panel display, a solid state display, a projector, or any other device for outputting media content being playback via media devices 130-135. Media devices 130-135 represent any appropriate device that is capable of executing client applications for access media content, providing access to the client applications via a graphical user interface displayed on display devices 140-145, for example, and includes and/or is communicatively coupled to, for example, one or more wired or wireless interfaces, such as WLAN radios, cellular radios, Bluetooth radios, Zigbee radios, near field communication (NFC) radios, and/or other wireless radios. Media devices 130-135 are depicted as being separate from but coupled to display devices 140-145, respectively. The subject technology is not limited to this arrangement and one or both of media devices 130-135 may be integrated into the respective display device 140-145.

For explanatory purposes, network environment 100 is illustrated in FIG. 1 as including electronic devices 105-115, servers 120-130, media devices 130-135, and display devices 140-145. However, network environment 100 may include any number of electronic devices, media devices, display device, and servers.

Figure 2:
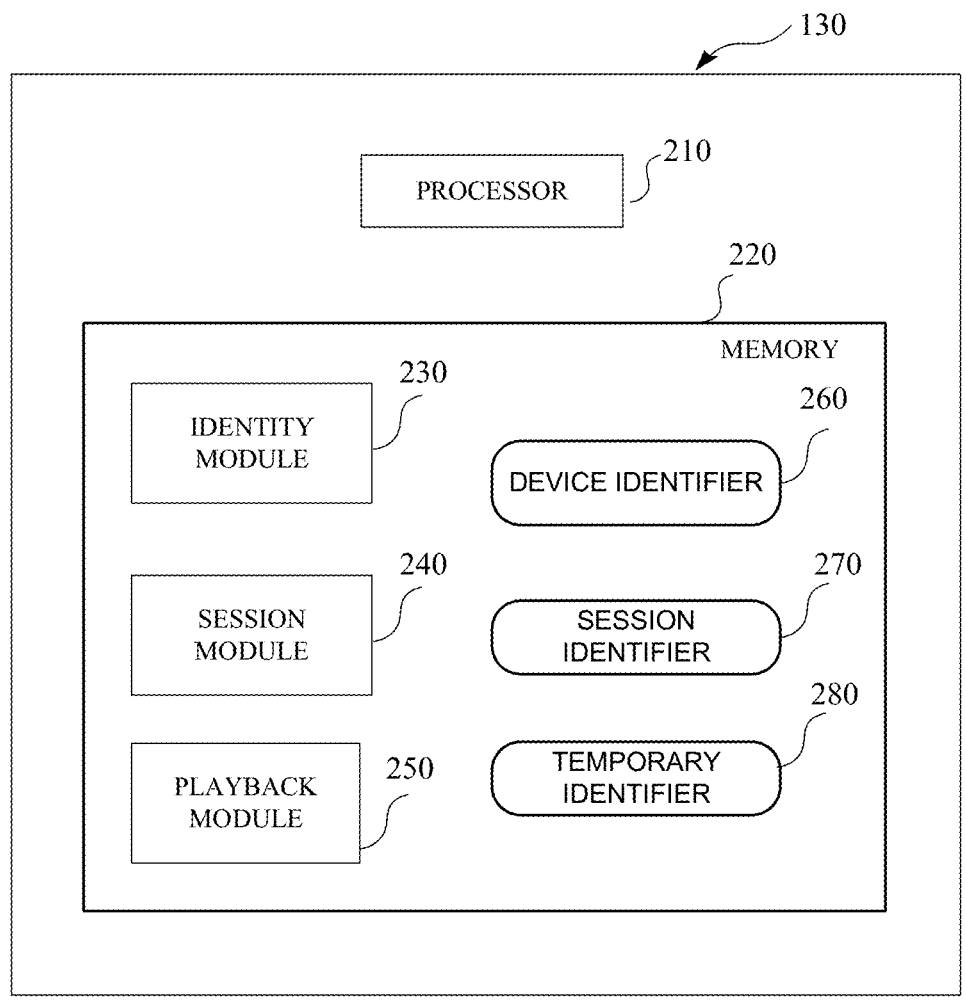
FIG. 2 is a block diagram illustrating components of a media device in accordance with one or more implementations of the subject technology.

FIG. 2 is a block diagram illustrating components of a media device in accordance with one or more implementations of the subject technology. While FIG. 2 depicts components of media device 130, FIG. 2 can correspond to any of media devices 130-135 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In the example depicted in FIG. 2, media device 130 includes processor 210 and memory 220. Processor 210 may include suitable logic, circuitry, and/or code that enable processing data and/or controlling operations of media device 130. In this regard, processor 210 may be enabled to provide control signals to various other components of media device 130. Processor 210 may also control transfers of data between various portions of media device 130. Additionally, the processor 210 may enable implementation of an operating system or otherwise execute code to manage operations of media device 130.

Processor 210 or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Memory 220 may include suitable logic, circuitry, and/or code that enable storage of various types of information such as received data, generated data, code, and/or configuration information. Memory 220 may include, for example, random access memory (RAM), read-only memory (ROM), flash memory, and/or magnetic storage. As depicted in FIG. 2, memory 220 contains identity module 230, session module 240, playback module 250, device identifier 260, session identifier 270, and temporary identifier 280. The subject technology is not limited to these components both in number and type, and may be implemented using more components or fewer components than are depicted in FIG. 2.

According to aspects of the subject technology, identity module 230 comprises a computer program having one or more sequences of instructions or code together with associated data and settings. Upon executing the instructions or code, one or more processes are initiated to provide an identity manager on media device 130 for provisioning and registering identifiers for media device 130 according to aspects of the subject technology. Device identifier 260 may be provisioned and registered with a server at the time of first startup of media device 130 and following an upgrade cycle for media device 130. Upon being contacted by a client device requesting an identifier for participation in a group chat session, temporary identifier 280 may be provisioned with the server for the group chat session. At the conclusion of the group chat session, temporary identifier 280 may be deleted.

According to aspects of the subject technology, session module 240 comprises a computer program having one or more sequences of instructions or code together with associated data and settings. Upon executing the instructions or code, one or more processes are initiated to provide a client application for participating in group chat sessions. A client device may send a request for a temporary identifier to add media device 130 to a group chat session. The group chat session may be identified with session identifier 270, which may be stored in memory 220 of media device 130. Session module 240 may return temporary identifier 280 provisioned by identity module 230 to the requesting client device and await an invite from a server to join the group chat session. Upon receiving an invite, session module 240 may compare a session identifier received in the invite from the server against session identifier 270 stored in memory 220. If the two identifiers match, media device 130 joins the group chat session. If the two identifiers do not match, media device 130 ignores the invite to join the group chat session.

According to aspects of the subject technology, playback module 250 comprises one or more sequences of instructions or code together with associated data and settings. Upon executing the instructions or code, one or more processes are initiated that are configured to provide a client application for accessing and playing/displaying media content from a server. In addition to facilitating the selection and playback of media content by a user, playback module 250 also may be configured to synchronize playback of media content with other media devices participating in a group chat session. If media device 130 is the initiator of the playback of particular media content, control and command signals received from a user by playback module 250 are repeated to other media devices participating in the group chat session in which the media content is being consumed by the group. If media device 130 is not the initiator of the playback of the media content, media device 130 receives control and command signals for controlling the playback of the media content for the participating group. The control and command signals include, but are not limited to, selection of media content, play, pause, rewind, fast forward, stop, etc.

Figure 3:
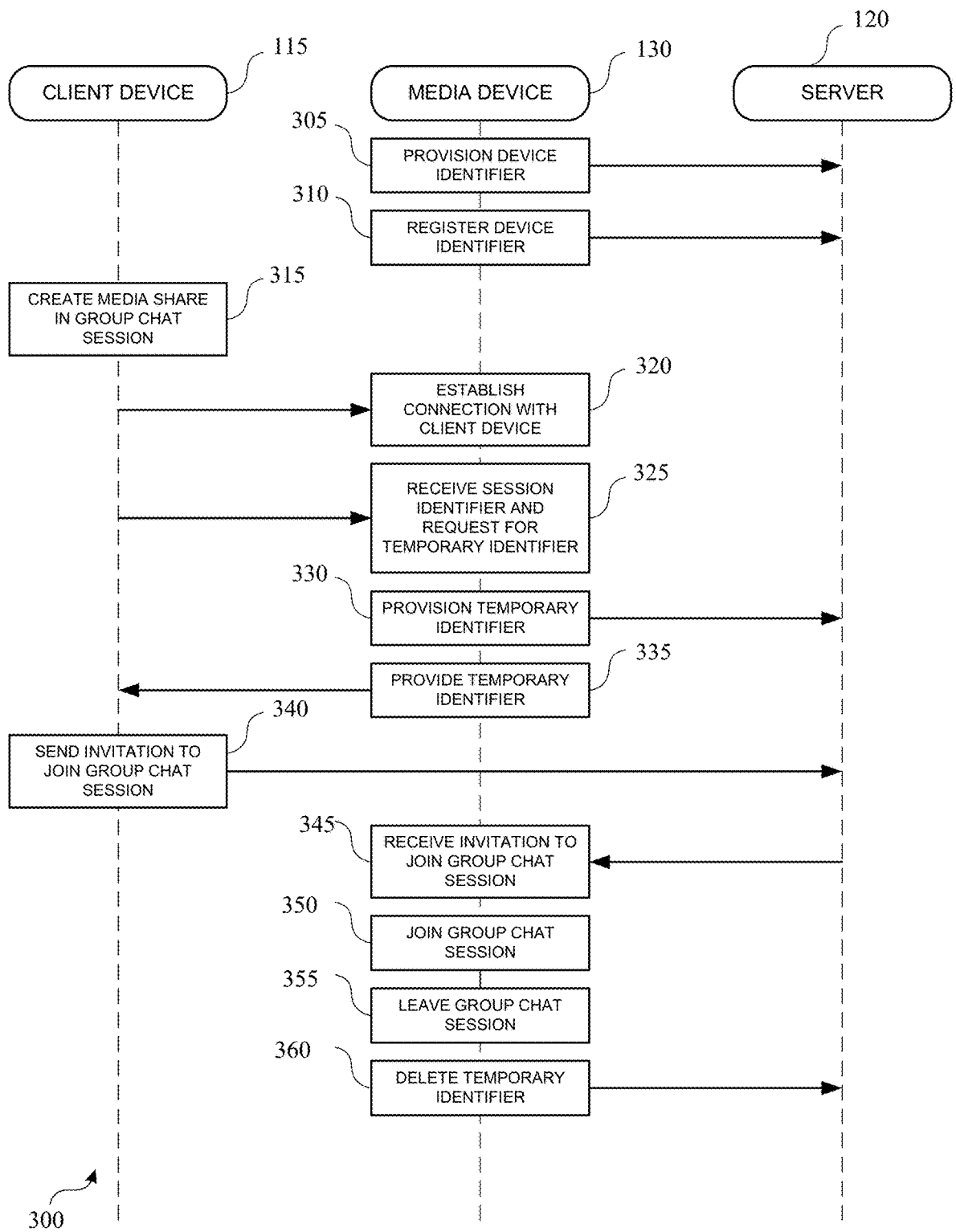
FIG. 3 illustrates an example process for a media device joining a group chat session according to aspects of the subject technology.

FIG. 3 illustrates an example process for a media device joining a group chat session according to aspects of the subject technology. For explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations. In this example, process 300 is described with respect to client device 115, media device 130, and server 120. However, the process is not limited to these components and may be practiced using other client devices, media devices, and/or servers.

When media device 130 starts up for the first time, or following a system upgrade, media device 130 provisions a device identifier with server 120 (block 305). According to aspects of the subject technology, media device 130 uses a hardware certificate on the device to provision the device identifier with server 120. The hardware certificate may be software generated based on intrinsic properties of the hardware of the device. Intrinsic properties of the hardware may include serial numbers, part numbers, keys provisioned on the media device at the time of manufacture, etc. With the provisioned device identifier, media device 130 registers with the server to be available for group chat sessions (block 310). As part of the registration, media device 130 may provide a list of technical capabilities, such as available hardware components, to server 120. In this regard, server 120 may limit session invitations for the media device to sessions that do not require any technical capabilities beyond those registered for media device 130.

When client device 115 is participating in a group chat session with one or more other client devices, the user of client device 115 may wish to share media content for consumption by the group participating in the group chat session. Within a user interface of a client application executing on client device 115 to provide access to the group chat session, an option may be to select a nearby media device to present selected media content. Selecting the nearby media device in the user interface may create a media share operation within the group chat session (block 315). Alternatively, the user interface of the client application may provide an option to select a nearby media device to add to a group chat session, with the selection of media content for presentation being made through the user interface at a later time. Other mechanisms for initiating a media share operation may be used within the scope of the subject technology.

As part of the media share operation, client device 115 may establish a connection with media device 130 (block 320) to send a request for a temporary identifier to facilitate adding media device 130 to the group chat session, which is identified using a session identifier in the request (block 325). The connection between client device 115 and media device 130 may be a direct connection that does not traverse an external network. For example, client device 115 and media device 130 may use Bluetooth, NFC, WiFi, etc. for a direct connection to communicate the request. In addition, the connection may be encrypted for security.

In response to the request, media device 130 may provision a temporary identifier with server 120 (block 330). The provisioning may be based on the device identifier previously provisioned and the session identifier included with the request received from the client device. The temporary identifier is intended to be unique to the particular group chat session identified in the request. In provisioning the temporary identifier, media device 130 may include a time limit for which the temporary identifier is good (e.g., four hours). At the end of the four hours, media device may be removed from the group chat session or media device 130 may renew the temporary identifier for another specified period of time. In one or more implementations, media device 130 may provision the temporary identifier locally and may provide an indication of the same to server 120.

After the temporary identifier has been provisioned, media device 130 provides the temporary identifier to client device 115 in response to the initial request received from client device 115 (block 335). Using the received temporary identifier, client device 115 sends an invitation to server 120 for media device 130 to join the group chat session identified by the session identifier (block 340). In turn, server 120 checks the temporary identifier to determine if it is for group chat sessions and to determine that the temporary identifier has not expired before sending an invitation to media device 130 to join the group chat session as a participant (block 345).

Media device 130 compares the session identifier received in the invitation from server 120 with the session identifier received in the request received from client device 115. If the two session identifiers match, media device 130 joins the group chat session (block 350). Otherwise, media device 130 ignores the invitation received from server 120. Media device 130 joins the group chat session as a different type of participant than client device 115. The different type of participant is identified to server 120 at the time of provisioning and registration. As the different type of participant, media device 130 is not subscribed by the server to any audio and/or video streams from the group chat session, but audio and/or video content from a content server is allowed to be communicated to media device 130. In addition, media device 130 as the different type of participant is not displayed on the participant lists available to the participating client devices. Since media device 130 does not receive any audio and/or video streams from the group chat session, there is little to no security risk in hiding media device 130 as a participant.

As a different type of participant, media device 130 may still receive a list of the identifiers of the other participants in the group chat session. Media device 130 may provide the list for display on the attached display device. Additional information regarding the other participants outside of the identifiers may be pushed directly to media device 130 from client device 115. The additional information may include full name, location, picture, etc.

As noted above, media device 130 is able to receive media content such as audio and/or video content, from a content server as a participant in the group chat session. Regarding communications within the group chat session, media device 130 may be limited to metadata, including command and control signals, communicated between participating devices that are playing back the selected media content for joint consumption among the participants in the chat session. The command and control signals may include timing signals, stop, play, pause, fast forward, rewind, etc. for the playback of the media content.

Media device 130 may leave the group chat session for any of a number of reasons (block 355). For example, a user of client device 115 that invited media device 130 to join the group chat session may deselect media device 130 and remove the device from the group chat session. If client device 115 leaves the group chat session while media device 130 is still a part of the session, media device 130 may leave the session as well. However, if client device 115 simply loses its connection or loses power and therefore drops off without any affirmative action taken by the user of client device 115, media device 130 may remain in the group chat session despite client device 115 dropping off. Upon leaving the group chat session, media device 130 invalidates the temporary identifier on the server and marks the temporary identifier for subsequent deletion by the server (block 360).

Figure 4:
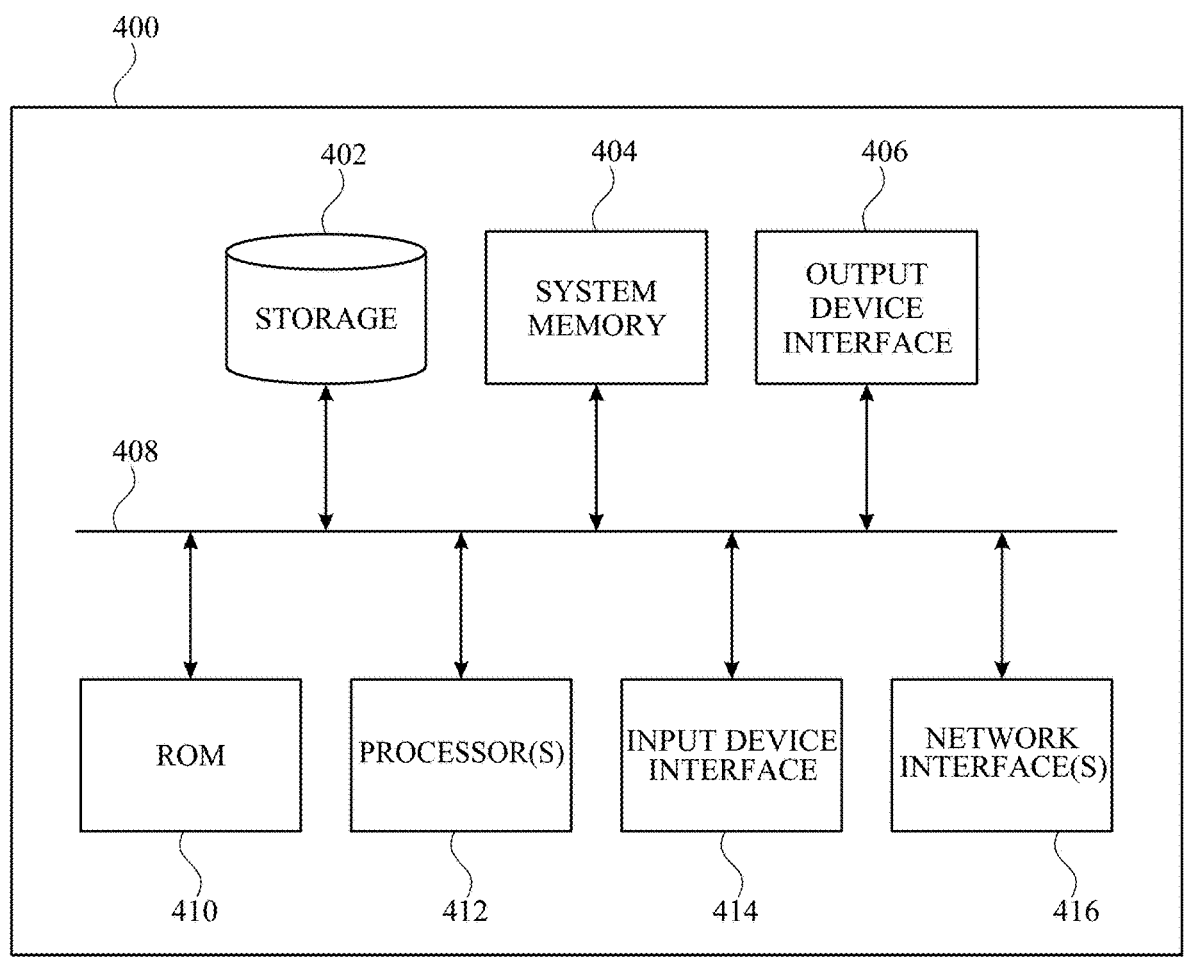
FIG. 4 illustrates an example system with which aspects of the subject technology may be implemented in accordance with one or more implementations.

FIG. 4 illustrates an electronic system 400 with which one or more implementations of the subject technology may be implemented. Electronic system 400 can be, and/or can be a part of, one or more of electronic devices 105-115, media devices 130-135, or servers 120-125 shown in FIG. 1. The electronic system 400 may include various types of computer readable media and interfaces for various other types of computer readable media. The electronic system 400 includes a bus 408, one or more processing unit(s) 412, a system memory 404 (and/or buffer), a ROM 410, a permanent storage device 402, an input device interface 414, an output device interface 406, and one or more network interfaces 416, or subsets and variations thereof.

The bus 408 collectively represents all system, peripheral, and chipset buses that communicatively connect the numerous internal devices of the electronic system 400. In one or more implementations, the bus 408 communicatively connects the one or more processing unit(s) 412 with the ROM 410, the system memory 404, and the permanent storage device 402. From these various memory units, the one or more processing unit(s) 412 retrieves instructions to execute and data to process in order to execute the processes of the subject disclosure. The one or more processing unit(s) 412 can be a single processor or a multi-core processor in different implementations.

The ROM 410 stores static data and instructions that are needed by the one or more processing unit(s) 412 and other modules of the electronic system 400. The permanent storage device 402, on the other hand, may be a read-and-write memory device. The permanent storage device 402 may be a non-volatile memory unit that stores instructions and data even when the electronic system 400 is off. In one or more implementations, a mass-storage device (such as a magnetic or optical disk and its corresponding disk drive) may be used as the permanent storage device 402.

In one or more implementations, a removable storage device (such as a floppy disk, flash drive, and its corresponding disk drive) may be used as the permanent storage device 402. Like the permanent storage device 402, the system memory 404 may be a read-and-write memory device. However, unlike the permanent storage device 402, the system memory 404 may be a volatile read-and-write memory, such as random access memory. The system memory 404 may store any of the instructions and data that one or more processing unit(s) 412 may need at runtime. In one or more implementations, the processes of the subject disclosure are stored in the system memory 404, the permanent storage device 402, and/or the ROM 410. From these various memory units, the one or more processing unit(s) 412 retrieves instructions to execute and data to process in order to execute the processes of one or more implementations.

The bus 408 also connects to the input and output device interfaces 414 and 406. The input device interface 414 enables a user to communicate information and select commands to the electronic system 400. Input devices that may be used with the input device interface 414 may include, for example, alphanumeric keyboards and pointing devices (also called "cursor control devices"). The output device interface 406 may enable, for example, the display of images generated by electronic system 400. Output devices that may be used with the output device interface 406 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 4, the bus 408 also couples the electronic system 400 to one or more networks and/or to one or more network nodes, such as the content provider 112 shown in FIG. 1, through the one or more network interface(s) 416. In this manner, the electronic system 400 can be a part of a network of computers (such as a LAN, a wide area network ("WAN"), or an Intranet, or a network of networks, such as the Internet. Any or all components of the electronic system 400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

According to aspects of the subject technology, a method is provided that includes receiving, at a media device and from a client device, a request for a temporary identifier for a group chat session, and provisioning, by the media device, the temporary identifier based on a device identifier of the media device. The media device provides the temporary identifier to the client device. The media device receives from a server an invitation to join the group chat session, where the invitation is directed to the temporary identifier, and the media device joins the group chat session.

The media device provisions the device identifier and registers the device identifier with the server. The device identifier is provisioned based on a hardware certificate of the media device. The method further includes registering device capabilities of the media device with the server, wherein the invitation to join the group chat session is based on the registered device capabilities satisfying requirements of the group chat session. The method further includes registering the temporary identifier with the server, and removing the temporary identifier from the server after the group chat session ends. The provisioned temporary identifier is unique to the group chat session and the device identifier of the media device is different from a user identifier used to log into the client device.

The method further includes establishing an encrypted connection between the media device and the client device, wherein the request for the temporary identifier is received by the media device via the encrypted connection, and the temporary identifier is provided to the client device via the encrypted connection. The request for the temporary identifier received from the client device comprises a session identifier for the group chat session, and the invitation to join the group chat session received from the server comprises the session identifier for the group chat session. The method further includes comparing the session identifier received in the request for the temporary identifier with the session identifier received in the invitation to join the group chat session, where the media device joins the group chat session upon matching the session identifier received in the request for the temporary identifier with the session identifier received in the invitation to join the group chat session.

The method further includes storing, in local memory on the media device, the session identifier for the group chat session received in the request for the temporary identifier, where the session identifier is not persisted across boot cycles of the media device. The method further includes communicating metadata for controlling playback of a media file during the group chat session. The method further includes receiving user identifiers for participants of the group chat session from the server, receiving additional identifying information regarding the participants of the group chat session from the client device, and providing the identifying information for display by the media device. The additional identifying information is pushed to the media device by the client device via a peer-to-peer connection.

According to aspects of the subject technology, a non-transitory computer-readable medium storing instructions which, when executed by one or more processors, cause the one or more processors to perform operations is provided. The operations include provisioning, by a media device, a device identifier based on a hardware certificate of the media device, and registering, by the media device, the device identifier with a server. The operations further include receiving, at the media device and from a client device, a request for a temporary identifier for a group chat session, and provisioning, by the media device, the temporary identifier based on the device identifier of the media device. The media device provides the temporary identifier to the client device and receives, from the server, an invitation to join the group chat session, wherein the invitation is directed to the temporary identifier. The media device joins the group chat session.

The operations further include registering the temporary identifier with the server and removing the temporary identifier from the server after the group chat session ends. The operations further include establishing an encrypted connection between the media device and the client device, where the request for the temporary identifier is received by the media device via the encrypted connection, and the temporary identifier is provided to the client device via the encrypted connection. The request for the temporary identifier received from the client device comprises a session identifier for the group chat session, and the invitation to join the group chat session received from the server comprises the session identifier for the group chat session. The operations further include comparing the session identifier received in the request for the temporary identifier with the session identifier received in the invitation to join the group chat session, where the media device joins the group chat session upon matching the session identifier received in the request for the temporary identifier with the session identifier received in the invitation to join the group chat session.

According to aspects of the subject technology, a media device is provided that includes a memory storing a plurality of computer programs, and one or more processors configured to execute instructions of the plurality of computer programs. The instructions include instructions to receive, from a client device, a request for a temporary identifier for a group chat session, and provision the temporary identifier based on a device identifier of the media device. The instructions further include instructions to register the temporary identifier with a server and provide the temporary identifier to the client device. The instructions further include instructions to receive, from the server, an invitation to join the group chat session, wherein the invitation is directed to the temporary identifier, join the group chat session, and remove the temporary identifier from the server after the group chat session ends.

The one or more processors further configured to execute the instructions to provision the device identifier based on a hardware certificate of the media device, and register the device identifier with the server. The request for the temporary identifier received from the client device comprises a session identifier for the group chat session, and the invitation to join the group chat session received from the server comprises the session identifier for the group chat session. The one or more processors further configured to execute the instructions to compare the session identifier received in the request for the temporary identifier with the session identifier received in the invitation to join the group chat session, where the media device joins the group chat session upon matching the session identifier received in the request for the temporary identifier with the session identifier received in the invitation to join the group chat session.

As described herein, aspects of the subject technology may include the collection and transfer of data from an application to other computing devices. The present disclosure contemplates that in some instances, this collected data may include personal information data that uniquely identifies or can be used to identify a specific person. Such personal information data can include demographic data, location-based data, online identifiers, telephone numbers, email addresses, home addresses, images, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in group chat sessions. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of video conferencing, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   establishing an encrypted connection between a media device and a client device;
   receiving, at the media device, from the client device, and via the encrypted connection, a request for a temporary identifier for a group chat session;
   provisioning, by the media device, the temporary identifier based on a device identifier of the media device;
   providing, by the media device and over the encrypted connection, the temporary identifier to the client device;

receiving, at the media device and from a server, an invitation to join the group chat session, wherein the invitation is directed to the temporary identifier; and joining, by the media device, the group chat session.

2. The method of claim 1, further comprising:

provisioning, by the media device, the device identifier; and registering, by the media device, the device identifier with the server.

3. The method of claim 2, wherein the device identifier is provisioned based on a hardware certificate of the media device.

4. The method of claim 2, further comprising:

registering device capabilities of the media device with the server, wherein the invitation to join the group chat session is based on the registered device capabilities satisfying requirements of the group chat session.

5. The method of claim 1, further comprising:

registering the temporary identifier with the server; and removing the temporary identifier from the server after the media device leaves the group chat session.

6. The method of claim 5, wherein the provisioned temporary identifier is unique to the group chat session.

7. The method of claim 1, wherein the device identifier of the media device is different from a user identifier used to log into the client device.

8. The method of claim 1, wherein the request for the temporary identifier received from the client device comprises a session identifier for the group chat session, and wherein the invitation to join the group chat session received from the server comprises the session identifier for the group chat session, and wherein the method further comprises:

comparing the session identifier received in the request for the temporary identifier with the session identifier received in the invitation to join the group chat session, wherein the media device joins the group chat session upon matching the session identifier received in the request for the temporary identifier with the session identifier received in the invitation to join the group chat session.

9. The method of claim 8, further comprising:

storing, in local memory on the media device, the session identifier for the group chat session received in the request for the temporary identifier, wherein the session identifier is not persisted across boot cycles of the media device.

10. The method of claim 1, further comprising:

communicating metadata for controlling playback of a media file during the group chat session.

11. The method of claim 1, further comprising:

receiving user identifiers for participants of the group chat session from the server;

receiving additional identifying information regarding the participants of the group chat session from the client device; and providing the identifying information for display by the media device.

12. The method of claim 11, wherein the additional identifying information is pushed to the media device by the client device via a peer-to-peer connection.

13. A non-transitory computer-readable medium storing instructions which, when executed by one or more processors, cause the one or more processors to perform operations comprising:

provisioning, by a media device, a device identifier based on a hardware certificate of the media device;

registering, by the media device, the device identifier with a server;

establishing an encrypted connection between the media device and a client device;

receiving, at the media device, from the client device, and via the encrypted connection, a request for a temporary identifier for a group chat session;

provisioning, by the media device, the temporary identifier based on the device identifier of the media device;

providing, by the media device and via the encrypted connection, the temporary identifier to the client device;

receiving, at the media device and from the server, an invitation to join the group chat session, wherein the invitation is directed to the temporary identifier; and joining, by the media device, the group chat session.

14. The non-transitory computer-readable medium of claim 13, wherein the operations further comprise:

registering the temporary identifier with the server; and removing the temporary identifier from the server after the media device leaves group chat session.

15. The non-transitory computer-readable medium of claim 13, wherein the request for the temporary identifier received from the client device comprises a session identifier for the group chat session, and wherein the invitation to join the group chat session received from the server comprises the session identifier for the group chat session, and wherein the operations further comprise:

comparing the session identifier received in the request for the temporary identifier with the session identifier received in the invitation to join the group chat session, wherein the media device joins the group chat session upon matching the session identifier received in the request for the temporary identifier with the session identifier received in the invitation to join the group chat session.

16. A media device, comprising:

a memory storing:

a plurality of computer programs; and one or more processors configured to execute instructions of the plurality of computer programs to:

establish an encrypted connection with a client device;

receive, from the client device and via the encrypted connection, a request for a temporary identifier for a group chat session;

provision the temporary identifier based on a device identifier of the media device;

register the temporary identifier with a server;

provide, via the encrypted connection, the temporary identifier to the client device;

receive, from the server, an invitation to join the group chat session, wherein the invitation is directed to the temporary identifier;

join the group chat session; and remove the temporary identifier from the server after leaving the group chat session.

17. The media device of claim 16, the one or more processors further configured to execute the instructions to:

provision the device identifier based on a hardware certificate of the media device; and register the device identifier with the server.

18. The media device of claim 16, wherein the request for the temporary identifier received from the client device comprises a session identifier for the group chat session, and wherein the invitation to join the group chat session received from the server comprises the session identifier for the group chat session, and wherein the one or more processors further configured to execute the instructions to:
compare the session identifier received in the request for the temporary identifier with the session identifier received in the invitation to join the group chat session,
wherein the media device joins the group chat session upon matching the session identifier received in the request for the temporary identifier with the session identifier received in the invitation to join the group chat session.

19. The non-transitory computer-readable medium of claim 13, wherein the device identifier of the media device is different from a user identifier used to log into the client device.

20. The media device of claim 16, wherein the device identifier of the media device is different from a user identifier used to log into the client device.

* * * * *